United States Patent
Muthuswamy et al.

(10) Patent No.: US 11,165,732 B2
(45) Date of Patent: Nov. 2, 2021

(54) SYSTEM AND METHOD TO DETECT AND DEFINE ACTIVITY AND PATTERNS ON A LARGE RELATIONSHIP DATA NETWORK

(71) Applicant: International Business Machines Corporation, Armonk, NY (US)

(72) Inventors: Srinivasan S. Muthuswamy, Ibblur (IN); Subhendu Das, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/824,932

(22) Filed: Mar. 20, 2020

(65) Prior Publication Data

US 2021/0297379 A1    Sep. 23, 2021

(51) Int. Cl.
  *H04L 12/00* (2006.01)
  *H04L 12/58* (2006.01)
  *G06F 16/28* (2019.01)
  *G06F 16/11* (2019.01)

(52) U.S. Cl.
  CPC ............ *H04L 51/14* (2013.01); *G06F 16/113* (2019.01); *G06F 16/288* (2019.01)

(58) Field of Classification Search
  CPC ............... G06F 16/9535; G06F 40/242; G06F 12/1018; H04L 67/1059; H04L 45/507; H04L 47/10; H04Q 3/0025
  USPC ................ 709/204, 202, 227, 238; 707/730; 717/178
  See application file for complete search history.

(56) References Cited

U.S. PATENT DOCUMENTS

| | | | |
|---|---|---|---|
| 6,332,165 B1* | 12/2001 | Hagersten | G06F 12/1018 709/238 |
| 6,643,682 B1* | 11/2003 | Todd | G06F 16/9535 709/202 |
| 8,117,233 B2 | 2/2012 | Liu et al. | |

(Continued)

OTHER PUBLICATIONS

Buhler, et al., "Large-Scale Graph Processing" Arcitura, https://patterns.arcitura.com/big-datpatterns/design_patterns/large_scale_graph_processing, Accessed Jan. 29, 2020, 3 pages.

(Continued)

*Primary Examiner* — Frantz Coby
(74) *Attorney, Agent, or Firm* — Scully, Scott, Murphy & Presser, P.C.

(57) ABSTRACT

A system and method of detecting data patterns in a relationship network that includes: inputting configuration criteria into a system; generating one or more messages based upon the relationship network and the configuration criteria; propagating the messages within the relationship network based on: forwarding the message in the relationship network if a receiver of the message is a pass-through node or is within the reach factor of an original sender, or terminating the message if the receiver of the message is outside the reach factor of the original sender, and archiving the one or more messages if the receiver of the message is within the reach factor set by the input configuration criteria, where the reach factor is the relationship of the original sender to the receiver as set by the configuration criteria. Optionally, collecting, aggregating, and applying insights on a per node basis to the relationship network.

20 Claims, 11 Drawing Sheets

(56) References Cited

U.S. PATENT DOCUMENTS

| | | | |
|---|---|---|---|
| 9,009,084 B2* | 4/2015 | Brandt | G05B 19/4185 |
| | | | 706/12 |
| 9,330,138 B1 | 5/2016 | Shankar et al. | |
| 9,342,391 B2* | 5/2016 | Kim | G06F 11/3006 |
| 9,396,287 B1 | 7/2016 | Bhave et al. | |
| 9,514,247 B1 | 12/2016 | Song et al. | |
| 9,560,068 B2* | 1/2017 | Figlin | H04L 63/1408 |
| 10,262,077 B2 | 4/2019 | Infante-Lopez | |
| 10,270,807 B2* | 4/2019 | Sysman | H04L 63/1425 |
| 2004/0015964 A1* | 1/2004 | McCann | H04Q 3/0025 |
| | | | 717/178 |
| 2009/0138494 A1 | 5/2009 | Goyal | |
| 2011/0004690 A1* | 1/2011 | Georgel | H04L 47/10 |
| | | | 709/227 |
| 2011/0280123 A1* | 11/2011 | Wijnands | H04L 45/507 |
| | | | 370/228 |
| 2013/0322248 A1* | 12/2013 | Guo | H04L 45/507 |
| | | | 370/235 |
| 2015/0220510 A1* | 8/2015 | Alba | G06F 40/242 |
| | | | 704/9 |
| 2015/0220643 A1* | 8/2015 | Alba | G06F 16/9535 |
| | | | 707/730 |
| 2015/0350259 A1 | 12/2015 | Garg et al. | |
| 2016/0212205 A1* | 7/2016 | Davenport | H04L 67/1059 |
| 2017/0140285 A1* | 5/2017 | Dotan-Cohen | H04W 4/02 |
| 2018/0330008 A1 | 11/2018 | Fan et al. | |

OTHER PUBLICATIONS

Alkhateeb, F., et al., "Extending SPARQL with Regular Expression Patterns (for Querying RDF)", Preprint submitted to Elsevier Science, Jul. 22, 2008, pp. 1-48.

Kanezashi, H., et al., "Adaptive Pattern Matching with Reinforcement Learning for Dynamic Graphs", https://arxiv.org/abs/1812.10321v1, Dec. 21, 2018, 10 pages.

Anonymous, "Method to Avoid Replication Delays for Large Update Queries", An IP.com Prior Art Database Technical Disclosure, IP.com No. IPCOM000245749D, Apr. 4, 2016, 2 pages.

Zeng, Z., et al., "Router: a message passing model for large-scale graph mining", 2011 International Conference on Cyber-Enabled Distributed Computing and Knowledge Discovery, Oct. 10-12, 2011, pp. 60-67.

IBM, "MDX Aggregate Cache", An IP.com Prior Art Database Technical Disclosure, IP.com No. IPCOM000193474D, Feb. 25, 2010, 3 pages.

* cited by examiner

*Message:*

*original sender* ← 500
*Sender*
*Receiver*
*target receiver* ← 505
*date/time:*
*Trace:*
*score:*

345

495

785

*Aggregated Insights*
At P2
[P1:1.0:P2] *
[P1:1.0:A1:1.0:A2:1.0:P3:1.0:P2] **
[P1:1.0:A1:1.0:P3:1.0:P2] **
1 hop = P1: 1.0
2 hop = P1: 1.0

At P3
[P1:1.0:P2:1.0:P3] **
[P1:1.0:A1:1.0:P3] *
[P1:1.0:A1:1.0:A2:1.0:P3] *
1 hop = P1: 1.0 (via A1, A2 and via A1)
2 hop = P1: 1.0 (via P2)

At P4
[P1:1.0:A1:1.0:A2:1.0:P4] *
[P1:1.0:A1:1.0:P3:1.0:A2:1.0:P4] **
1 hop = P1: 1.0 (via A1, A2)
2 hop = P1: 1.0 (via P3)

At P5
[P1:1.0:A1:1.0:A2:1.0:A3:1.0:P5]*
[P1:1.0:A1:1.0:P3:1.0:A2:1.0:A3:1.0:P5]**
1 hop = P1: 1.0 (via A1, A2, A3)
2 hop = P1: 1.0 (via P3)

*Pattern definition in input*
*Risk by association:*
- *Seed Nodes: party with SAR/ PEP / Sanctions*
- *Pass-through: account*
- *Filters: node / edge filter criteria*
- *Receivers: party*
- *Trace: true*
- *Reach factor: 2*
- *Cycles allowed: false*
- *Path: shorted path*
- *Aggregate: original sender id, score, reach*
- *Termination: reach*

*Temporal Cycle*
- *Seed Nodes: accounts linked to SAR/ PEP / Sanctions parties*
- *Pass-through: account*
- *Filters: node / edge filter criteria: more or less same amount + time in temporal order*
- *Receivers: account*
- *Trace: true*
- *Reach factor: 2*
- *Cycles allowed: false*
- *Path: all paths*
- *Termination: receiver and original sender are same*

Fig. 10

*Message propagation*
1105 — *[P1:1.0]*

1107 — *[P1:1.0:P2] \**
*[P1:1.0:A1]*

1110 — *[P1:1.0:P2:1.0:P3] \*\**
*[P1:1.0:A1:1.0:P3] \**
*[P1:1.0:A1:1.0:A2]*

1115 — *[P1:1.0:A1:1.0:P3:1.0:P2] \*\**
*[P1:1.0:A1:1.0:P3:1.0:A2]*
*[P1:1.0:A1:1.0:A2:1.0:P3] \**
*[P1:1.0:A1:1.0:A2:1.0:P4] \**
*[P1:1.0:A1:1.0:A2:1.0:A3]*

*[P1:1.0:A1:1.0:P3:1.0:A2:1.0:A1] -- invalid (due to loop)*
*[P1:1.0:A1:1.0:P3:1.0:A2:1.0:P4] \*\**
*[P1:1.0:A1:1.0:P3:1.0:A2:1.0:A3]*

*[P1:1.0:A1:1.0:A2:1.0:P3:1.0:P2] \*\**
*[P1:1.0:A1:1.0:A2:1.0:P4] - no more paths without loop*
*[P1:1.0:A1:1.0:A2:1.0:A3:1.0:P5] \**
*[P1:1.0:A1:1.0:P3:1.0:A2:1.0:A3:1.0:P5]\*\**

Fig. 11

*Impacted Paths for re-compute insights*

[P1:0.5:A1]
[P1:0.5:A1:1.0:P3]
[P1:0.5:A1:1.0:A2]
[P1:0.5:A1:1.0:P3:1.0:P2]
[P1:0.5:A1:1.0:P3:1.0:A2]
[P1:0.5:A1:1.0:A2:1.0:P3]
[P1:0.5:A1:1.0:A2:1.0:P4]
[P1:0.5:A1:1.0:A2:1.0:A3]

[P1:0.5:A1:1.0:P3:1.0:A2:1.0:A1] – *invalid (due to loop)*
[P1:0.5:A1:1.0:P3:1.0:A2:1.0:P4]
[P1:0.5:A1:1.0:P3:1.0:A2:1.0:A3]

[P1:0.5:A1:1.0:A2:1.0:P3:1.0:P2]
[P1:0.5:A1:1.0:A2:1.0:P4] – *no more paths without a loop*
[P1:0.5:A1:1.0:A2:1.0:A3:1.0:P5]
[P1:0.5:A1:1.0:P3:1.0:A2:1.0:A3:1.0:P5]

*Updated Insights*
At P2
*[P1:1.0:P2]* \*
*[P1:0.5:A1:1.0:A2:1.0:P3:1.0:P2]* \*\*
*[P1:0.5:A1:1.0:P3:1.0:P2]* \*\*
*1 hop = P1: 1.0*
*2 hop = P1: 0.5*

At P3
*[P1:1.0:P2:1.0:P3]* \*\*
*[P1:0.5:A1:1.0:P3]* \*
*[P1:0.5:A1:1.0:A2:1.0:P3]* \*
*1 hop = P1: 0.5 (via A1, A2 and via A1)*
*2 hop = P1: 1.0 (via P2)*

At P4
*[P1:0.5:A1:1.0:A2:1.0:P4]* \*
*[P1:0.5:A1:1.0:P3:1.0:A2:1.0:P4]* \*\*
*1 hop = P1: 0.5 (via A1, A2)*
*2 hop = P1: 0.5 (via P3)*

At P5
*[P1:0.5:A1:1.0:A2:1.0:A3:1.0:P5]* \*
*[P1:0.5:A1:1.0:P3:1.0:A2:1.0:A3:1.0:P5]*\*\*
*1 hop = P1: 0.5 (via A1, A2, A3)*
*2 hop = P1: 0.5 (via P3)*

Fig. 16

SYSTEM AND METHOD TO DETECT AND DEFINE ACTIVITY AND PATTERNS ON A LARGE RELATIONSHIP DATA NETWORK

BACKGROUND

The disclosure herein relates generally to information handling and/or data processing systems, and more particularly, to methods, apparatus, and data processing systems for creating a relationship network, for example a graph, and defining and detecting data patterns within the relationship network, for example a large scale data network or graph.

There is a regulatory need for monitoring financial transactions and activity of account holders at financial and insurance institutions to detect any fraudulent or criminal activity such as, for example, money laundering. Governmental anti-money laundering (AML) and other regulations may require a financial institution to monitor for activities and behavior indicative of criminal or fraudulent activity. Detecting financial activity indicative of fraudulent or criminal activity is increasingly difficult due to the involvement of a large amount of information, such as multiple financial transactions and large numbers of parties, and electronic transactions.

Thus, it is desired to introduce an approach of detecting activity indicative of fraud, criminal behavior, and other suspicious activity indicative of risk. There is a need for advanced information and data processing techniques and systems to discover, develop, create and graph relationship networks, and/or define and detect data patterns within the relationship network, for example a large scale data network of financial transactions and the like involving numerous parties and transactions.

SUMMARY

The summary of the disclosure is given to aid understanding of, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the system, the architectural structure, and their method of operation to achieve different effects.

A method of detecting data patterns in a relationship network is disclosed that includes: inputting configuration criteria into a system; generating one or more messages based upon the relationship network and the configuration criteria; propagating the one or more messages within the relationship network based on: forwarding the message in the relationship network if a receiver of the message is a pass-through node or is within the reach factor of an original sender, or terminating the message if the receiver of the message is outside the reach factor of the original sender, where the reach factor is the relationship of the original sender to the receiver as set by the input configuration criteria; and archiving the one or more messages if the receiver of the message is within the reach factor set by the input configuration criteria. In an embodiment, wherein generating one or more messages preferably are generated by a seed module, and in an aspect based upon the relationship network and the configuration criteria comprises assigning a role of nodes in the relationship network as one of either initiator node, pass-through node, or receiver node based upon the configuration criteria and the relationship network. In a further aspect, a message dispatcher module propagates the one or more messages within the relationship network, and in an embodiment the message dispatcher module fetches the generated messages from a message repository, reads the generated messages, and based upon the relationship network forwards the generated messages in the relationship network.

In one or more embodiments, forwarding the generated message includes determining the one or more nodes directly connected to the receiver of the message based upon the relationship network and forwarding the message to the directly connected nodes. In an aspect, the message is not forwarded in the network if a pathway the message traverses in the relationship network from the original sender to the receiver forms a loop. The method further includes in an embodiment archiving the messages, preferably in an insights repository. In an aspect, the method further comprises collecting and aggregating the archived messages for each node as insights, and in an embodiment implementing an insights module to collect and aggregate the archived messages for each node. The method according to an aspect includes updating the relationship network with additional input data, and using a trace to update the message propagation to identify new nodes and any new insights as a result of updating the relationship network with additional input data.

In one or more embodiments a system for detecting patterns in a relationship network is disclosed, the system includes: an input configuration module for inputting configuration criteria into the system to define the data patterns to be detected, the input configuration module configured and adapted to receive input from a user; and a pattern detection module configured to receive the configuration criteria from the configuration module and to receive relationship network information, the pattern detection module configured to detect data patterns as defined by the configuration criteria input in the input configuration module. The pattern detection module in an embodiment includes: a message orchestrator configured to control the pattern detection module; a seed module configured to generate one or more seed messages based upon information received from the message orchestrator; a message dispatcher module configured to propagate the one or more seed messages through the relationship network as propagated messages; and an insights module configured to save insights in an insights repository. The pattern detection module according to an embodiment receives information on the relationship network and the insights module saves the seed messages, the propagated messages, and combinations of the seed messages and the propagated messages as insights based upon the information the pattern detection module receives on the relationship network and the configuration criteria received from the input configuration module which are both used to determine whether the seed messages or propagated messages meet insight criteria. The seed module in an aspect is configured to generate the one or more seed messages based upon the relationship network and the information received from the message orchestrator, and wherein the seed module is configured to assign a role of the nodes in the relationship network as one of either an original sender node, pass-through node, or receiver node based upon the relationship network and information received from the message orchestrator. The message dispatcher in one or more embodiments is configured to read the one or more seed messages and propagate the one or more seed messages based upon on: (a) forwarding each seed message as a propagated message if the receiver node of the seed message is a pass-through node or is within the reach factor of the original sender node; (b) forwarding each propagated message if the receiver node of the propagated message is a pass-through node or is within the reach factor of the original sender node; or (c) terminating the seed message or propagated message if the receiver node is outside the reach factor of the original sender node or if a pathway the seed message or propagated message traverses in the relationship network from the original sender node to the receiver node forms a loop. Forwarding each seed message or each propagated message in an aspect includes determining from the relationship network the one or more nodes directly connected to the receiver node of the seed message or the propagated message and forwarding the seed message or propagated message to the one or more directly connected nodes as the new receiver node. The insights module is further configured in an aspect to collect and aggregate insights on a per node basis, and the pattern detection module in an aspect is configured to apply the insights to the relationship network.

The foregoing and other objects, features and advantages of the invention will be apparent from the following more particular descriptions of exemplary embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a system and method to detect data patterns in a relationship network will be better understood when read in conjunction with the figures provided. Embodiments are provided in the figures for the purpose of illustrating aspects, features, and/or various embodiments of the systems and methods, but the claims should not be limited to the precise arrangement, structures, features, aspects, systems, modules, functional units, assemblies, subassemblies, systems, circuitry, embodiments, methods, processes, techniques, and/or devices shown, and the arrangements, structures, systems, modules, functional units, assemblies, subassemblies, features, aspects, methods, processes, techniques, circuitry, embodiments, and devices shown may be used singularly or in combination with other arrangements, structures, assemblies, subassemblies, systems, modules, functional units, features, aspects, circuitry, embodiments, methods, techniques, processes, and/or devices.

FIG. 10 illustrates an example of the input data or configuration criteria submitted or set in the input configuration module by a user.

FIG. 11 illustrates an example of message propagation in an example relationship network.

FIG. 16 illustrates insights aggregated by nodes in a system of detecting patterns and creating insights based upon processing of messages in an updated network system.

DETAILED DESCRIPTION

The following description is made for illustrating the general principles of the invention and is not meant to limit the inventive concepts claimed herein. In the following detailed description, numerous details are set forth in order to provide an understanding of the system, method and techniques for defining and detecting data patterns in a large relationship network, and/or collecting and aggregating insights based upon the relationship network, however, it will be understood by those skilled in the art that different and numerous embodiments of the system and its method of operation may be practiced without those specific details, and the claims and disclosure should not be limited to the arrangements, structures, systems, assemblies, subassemblies, modules, functional units, circuitry, features, aspects, processes, methods, techniques, embodiments, and/or details specifically described and shown herein. Further, particular features, aspects, arrangements, systems, modules, functional units, embodiments, techniques, etc. described herein can be used in combination with other described features, aspects, arrangements, systems, modules, functional units, embodiments, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

The following discussion omits or only briefly describes conventional features of information processing systems and data networks, which should be apparent to those skilled in the art. It is assumed that those skilled in the art are familiar with data processing and large scale data processing (also referred to as information/data processing systems) and their operation. It may be noted that a numbered element is numbered according to the figure in which the element is introduced, and is typically referred to by that number throughout succeeding figures.

Figure 1:
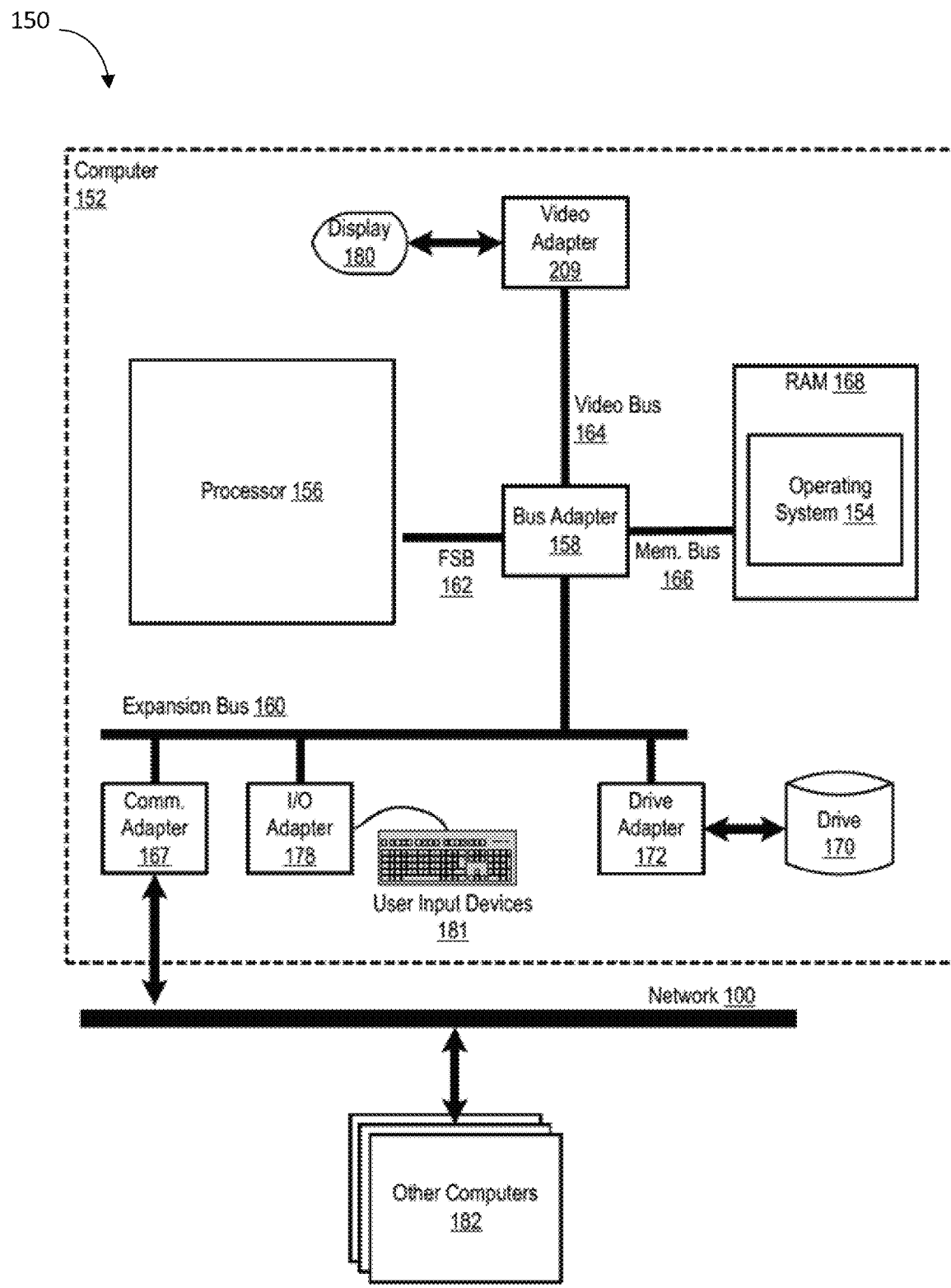
FIG. 1 is a functional block diagram illustrating a computer system, according to embodiments of the present disclosure.

FIG. 1 is a functional block diagram illustrating a data processing system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components such as, for example, data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1. The present disclosure encompasses any computing structure, including personal computers, servers, and mainframe computing structures including multiple CPUs.

The present disclosure is directed to systems and methods to create a relationship network or graph, e.g., a large scale relationship network, and/or define and detect data patterns on the relationship network, e.g., the graph. In one or more embodiments, the systems and methods include ingesting data, in an aspect large amounts of data, and processing the data to form a relationship network or data network, and selecting a data desirous of being detected by a user, seeding a pattern detection module with a configuration and definitions for the desired data pattern for detection, running the pattern detection module to pass messages through the relationship network, and implementing an insights module to aggregate messages and generate insights. In one or more embodiments, the system and method captures data patterns and activity in a uniform manner to create a large relationship network or graph and runs message propagation techniques to detect data patterns that may be indicative of suspicious activity or behavior. The system and method in one or more embodiments can capture and detect different data patterns indicative of risk and/or suspicious activity, such as, for example, guilt by association, circular money flow, mule detection, and the like.

Figure 2:
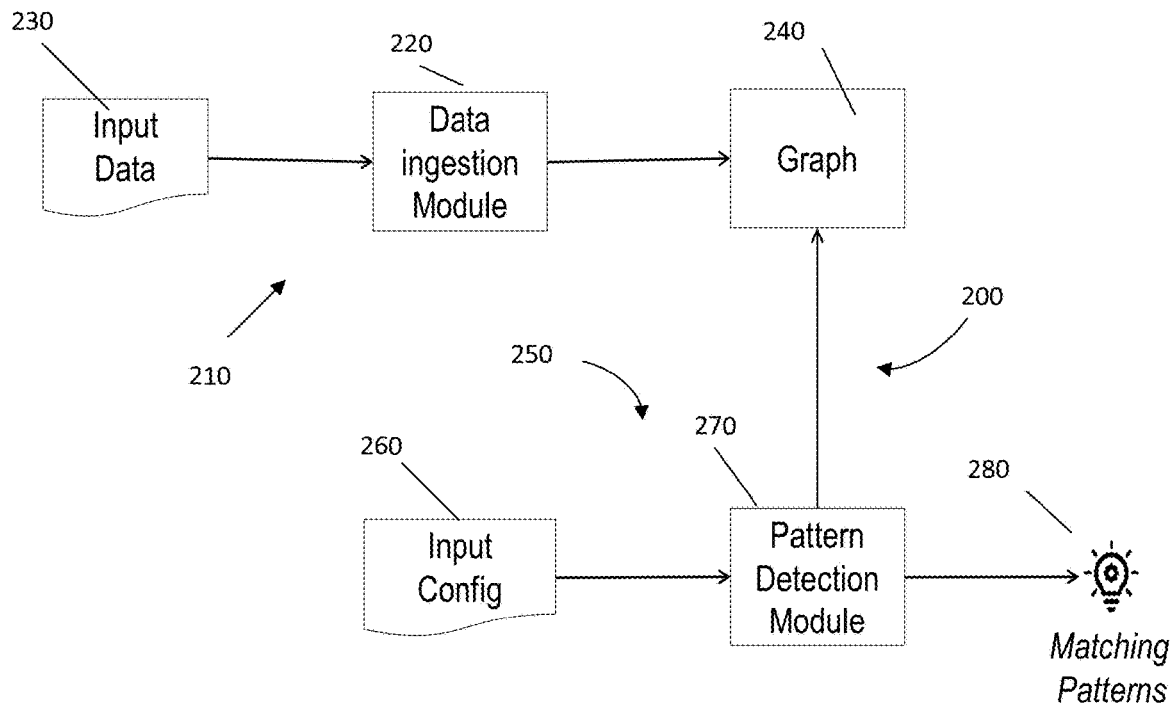
FIG. 2 depicts a block diagram of an embodiment of a system for processing data, including creating a relationship network, defining and detecting data patterns and creating insights based upon processing of messages generated by the system and propagated within the relationship network.

FIG. 2 illustrates a block diagram of an embodiment of a system and method to create a large relationship network or graph, and/or define and detect different data patterns in the relationship network, and/or collect and aggregate insights based upon the relationship network. In a first part 210 of system 200, data ingestion module 220 reads input data 230 and creates graph 240. Graph 240 in one or more embodiments is a large scale relationship network, also referred to as a data network. The data ingestion module 220 includes circuitry and logic to receive the input data 230 and process the data to output graph or network 240. The system 200 is particularly adapted to define and/or detect data patterns in the relationship network indicative of suspicious activity typically associated with fraud, money laundering, and/or criminal activity. In one or more embodiments, the input data 230 comprises parties, accounts, transactions, etc. For example, where a financial institution, such as for example a bank, desires to determine if there is a money laundering scheme or other fraud, for example as a result of governmental oversight, or regulations, such as for example anti-money laundering (AML) laws, the input data 230 can comprise: the transactions occurring with or being processed by the financial institution; the parties to any financial transaction with or through the financial institution; and account information (the customers) of the financial institution. In the case of an insurance organization and the like, the input data 230 can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing the motor vehicle, physician treating patient, etc. The examples above are not limiting and there can be other situations where the system 200 will have application, and additional or other input data can be provided.

Figure 3:
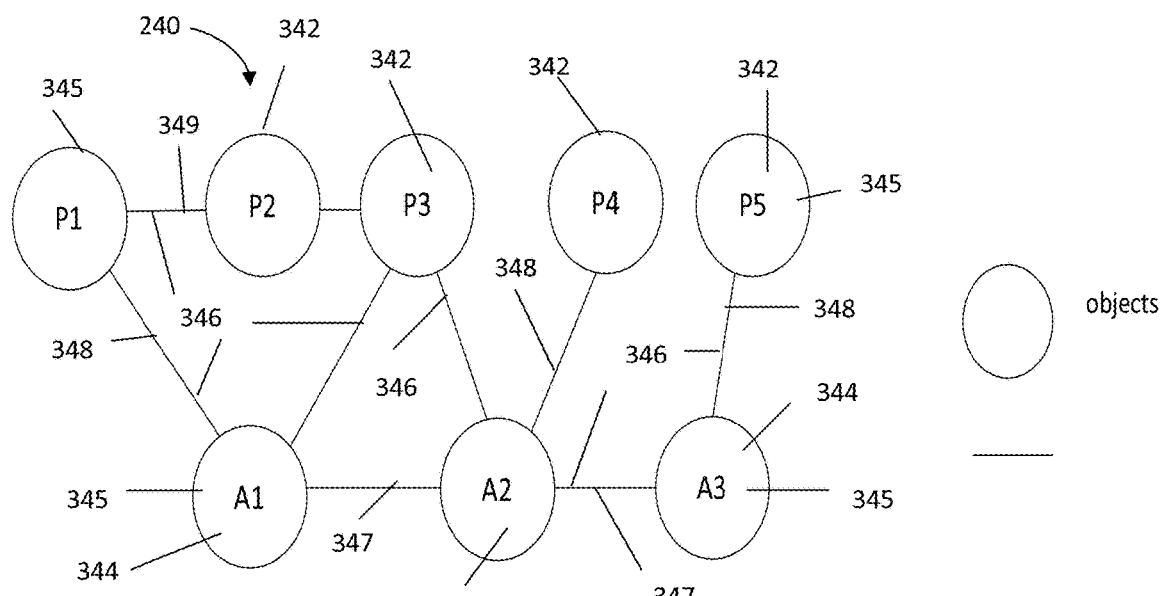
FIG. 3 is an illustration of an embodiment of a relationship network.

The input data 230 is input into the data ingestion module 220 which outputs a relationship network or transactional network 240, also referred to as a network graph 240. The data ingestion module 220 contains circuitry and logic to receive input data 230 and process the data to create the relationship network or graph 240. In most instances, large amounts of data are input and processed by the data ingestion module 220 and the relationship network or graph 240 is a large scale relationship network or graph 240. The transactional or relationship network 240 includes for example, objects and relationships. Objects for example can be people, accounts, policies, etc. The transactional or relationship network 240 from processing input data 230 of a financial institution would include, for example, parties, party-account relationships, account-account transactional relationships, and party-party relationships. FIG. 3 illustrates an example of a portion of the transactional network or transactional graph 240 produced by the data ingestion module 220 based upon input data 230 of a financial institution. It can be appreciated that the relationship network or graph 240 typically will include much more data and be of a much larger scale than illustrated in FIG. 3. Objects 345 in FIG. 3 are shown as nodes. The nodes 345 in FIG. 3 are parties 342 or accounts 344 where parties P1, P2, P3, P4 and P5 are illustrated as party nodes 342, and accounts A1, A2, A3 are illustrated as account nodes 344. Links 346 show the relationship between the nodes 345 e.g., which parties and accounts are connected. Links 347 show transaction relationships, links 348 show account holder relationships, and links 349 show party relationships.

The second part 250 of the system 200 in FIG. 2 includes input configuration module 260, and pattern detection module 270 for detecting data patterns 280. The input configuration module 260 sets up the system to detect desired data patterns indicative of activity or behavior in the transaction network. The input configuration module 260 contains circuitry and logic to receive the input configuration information from the user, and process and/or transmit information and data to the pattern detection module 260. A user inputs information to the system 200, and in particular the second part 250 of the system, vis-à-vis the input configuration module 260 so that the system knows the type of data patterns indicative of suspicious activity or behavior that the system 200, and in particular the second part 250 of the system 200, will search for and detect. That is, the user defines through the input configuration module 260 the type of data pattern 280 the system 200 should detect, and in particular the type of pattern 280 the second part 250, more particularly the pattern detection module 270, of the system 200 should search for in the relationship network or graph 240. The pattern detection module 270 reads data from the network or graph 240 and detects patterns of behavior or activity 280 in the relationship network 240 as defined by the input configuration selected and input by the user. The pattern detection module 270 contains circuitry and logic to receive input configuration data from input configuration module 260, receive relationship network data, process the input configuration and the relationship network data 240 to detect data patterns, and in one or more embodiments create insights, including in an aspect aggregating and applying the insights to the relationship network 240.

Figures 4, 5:
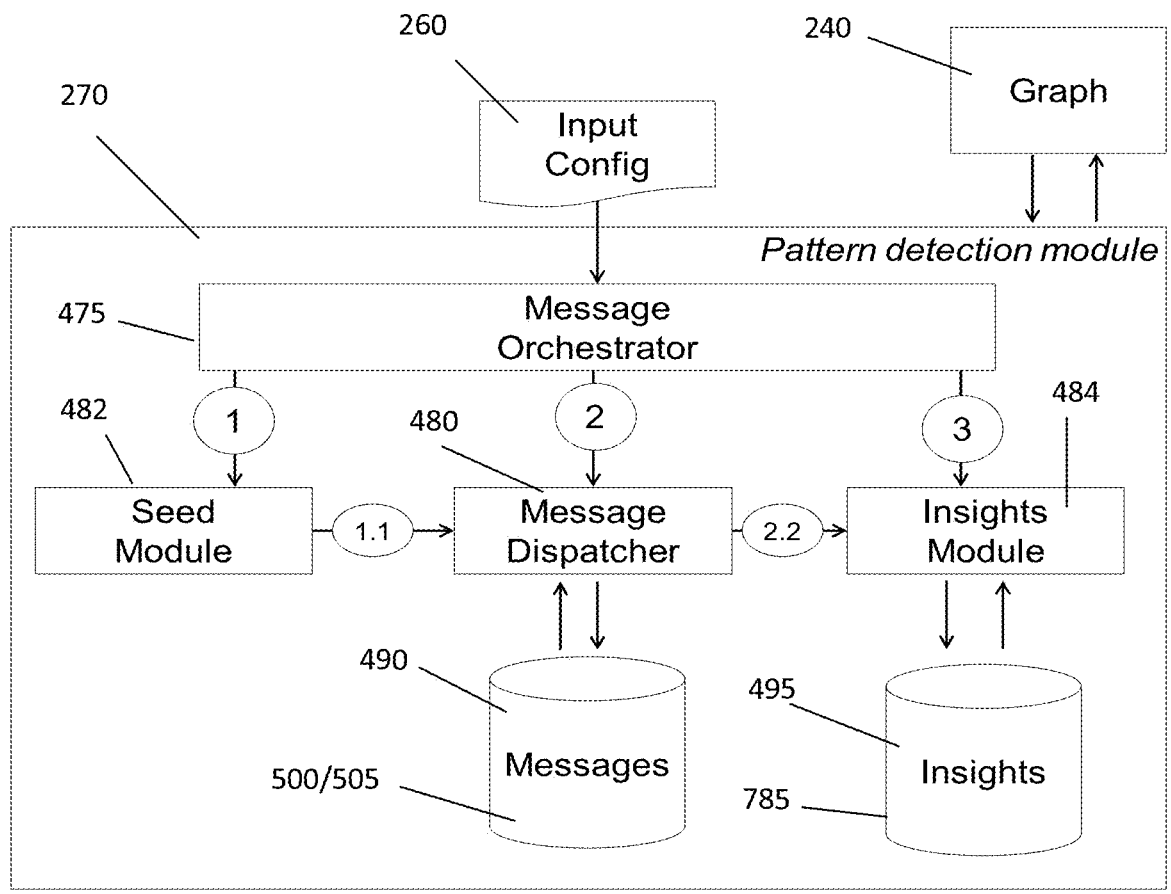
FIG. 4 depicts a block diagram of an embodiment of a pattern detection module.
FIG. 5 illustrates an example of the information identified in a message generated by the system and propagated in the relationship network.

FIG. 4 illustrates an embodiment of pattern detection module 270. Pattern detection module 270 in one or more embodiments includes a message orchestrator 475, a seed module 482, a message dispatcher 480 and an insights module 484. Pattern detection module 270 in an aspect also includes a message repository 490 and an insights repository 495. The message orchestrator 475 contains circuitry and logic to control the seed module 482, the message dispatcher 480, and the insights module 484 and to invoke the modules for detecting patterns 280 in the network or graph 240. As an overview, the message orchestrator 475 receives the input configuration 260, which instructs the message orchestrator 475 on the type of data pattern 280 to detect and the criteria, filters, and/or rules to apply during data pattern detection. The message orchestrator 475 calls the seed module 482 and in an embodiment passes the input configuration onto, or defines the input configuration for, the seed module 482. The seed module 482 contains circuitry and logic to generate, initialize, or initiate the seed messages, which in an embodiment are sent to the message repository 490. After transmitting the messages to the message repository 490, seed module 482 gives control back to the message orchestrator 475. The message orchestrator 475 then involves the message dispatcher module 480 which contains circuitry and logic to read the messages and dispatch each message to its target receiver as defined by the criteria, filter and/or rules selected by input configuration 260. The message dispatcher module 480 propagates and dispatches all messages until there are no more messages in the message repository 490 to process. The message dispatcher module 480 also maintains the message repository 490. The message dispatcher module 480 propagates the messages by reading the network/graph 240 and forwarding, saving, and/or terminating the messages according to the criteria, filters, and/or rules defined and selected by input configuration 260. The messages that meet the criteria defined by the system (based upon the input configuration) are saved by the insights module 484 as insights in the insights repository 495. The insights module 484 contains circuitry and logic to maintain and save the insights in the insights repository 495. The message orchestrator 475 calls the insights module 484 to aggregate the insights saved in the insights repository 495, and in one or more embodiments saves and/or applies the insights to the graph 240. The message orchestrator 475, the seed module 482, the message dispatch module 480, and the insights module 484 all contain circuitry and logic to perform their recited functions.

The seed module 482, based upon input configuration 260 received by the message orchestrator 475, generates or prepares the initial seed messages. The messages, including the initial seed messages, contain and identify information based upon the type of pattern to be detected and the criteria, filters, and/or rules selected through the input configuration 260 and implemented by the seed module 482 and the message dispatcher module 480. FIG. 5 shows an example of the information identified and/or contained in a (propagated) message 500, including an initial seed message 505. In the example of FIG. 5, the propagated message 500, and initial or seed message 505 identifies and contains: original sender data/identifier; sender data/identifier; receiver data/identifier; target receiver data/identifier; date/time data; trace data; and score. The trace data is the path taken through the network 240 from the initiator or seed node (the original sender) to the receiver node. The information identified in the seed message is updated as the message is forwarded and propagated in the relationship network. More or less information can be identified and contained in message 500, or initial seed message 505.

Figure 6:
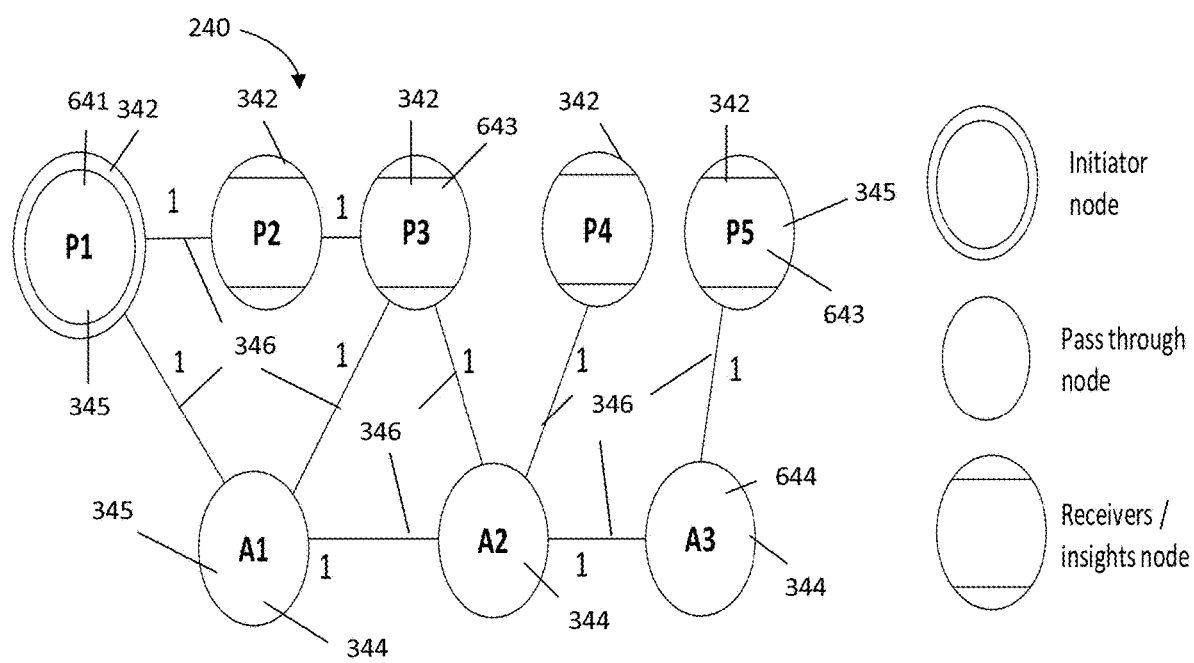
FIG. 6 is an illustration of the relationship network where the nodes have been annotated based upon the input configuration.

When the seed module 482 prepares the initial seed messages 505, the "original sender" is identified in the network 240 and is referred to as the initiator or seed node 641 as shown in FIG. 6. The seed module 482 based upon the input configuration 260 and the relationship network 240 runs a filter, such as for example applying the rules or criteria selected as input configuration data, to identify all the seed or initiator nodes 641. The seed module 482 also in one or more embodiments identifies the "sender", which in the case of the initial messages 505 is the same as the "original sender". The seed module 482 also in an embodiment identifies the "receiver" and the "target receiver". The "receiver" is the particular node that receives the message 500/505 and can be a party object or an account object. To determine the "receiver" the seed module 482 in an aspect looks at the relationship data of the initiator or seed node from the relationship network or graph 240, and from the relationship network 240 the seed module 482 identifies all the nodes to which the initiator node is directly connected. The seed module 482 generates or prepares the initial messages based upon the nodes to which the initiator or seed node is directly connected. That is, in one or more embodiments, for each node that the initiator or seed node is directly connected, the seed module 482 creates one initial message 505. If the initiator or seed node is directly connected to four (4) nodes for example, then in an embodiment four (4) initial messages 505 are created. The seed module 482 when creating the initial messages identifies the initiator or seed node as the "original sender" and the directly connected node as the "receiver." The "target receiver" is the object type, e.g., a party or account node/object or any other type of object that is supposed to carry the propagated risk.

The seed module 482 also sets forth the trace or the pathway for the initial message 505, which for the initial message is set as P1. The seed module 482 also sets or assigns the weight score to be associated with the relationship between the nodes based upon the input configuration 260. That is, the weight or score is set by the user, and may be set by the type of activity being searched for in the network. These initial messages need to be sent to and/or stored in the message repository 490 so the seed module 482 involves the message dispatcher 480 to send the initial message(s) to the message repository 490 and the initial messages are sent to and stored in the message repository 490. Control is then turned back from the seed module 482 to the message orchestrator 475.

Figures 7, 8:
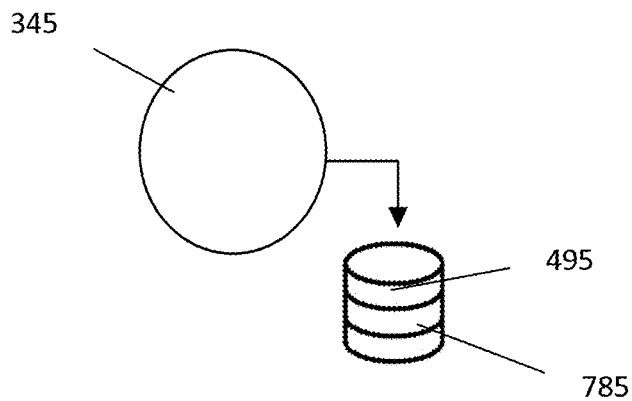
FIG. 7 is an illustration of a block diagram of saving insights of an object or node to an insights repository.
FIG. 8 illustrates an example of insights aggregated by nodes in a system of detecting patterns and creating insights based upon processing of messages in a relationship network.

The system 200 has now been initialized with the initial seed messages generated and in the message repository 490 and the message orchestrator 475 has control. The message orchestrator 475 calls the message dispatcher 480 to propagate the initial messages through the relationship network 240 and detect certain data patterns 280. The message dispatcher 475 looks at the message repository 490 and reads the initial message(s) 505. The message dispatcher 480 reads the messages 500, including to start the initial messages 505, for a given node and (a) if the given object/node is the receiver node and if the reach factor (which is a measure of the degree of relationship with the initiator node) is reached, then the message 500/505 is archived (stored) as an insight 685 in the insights repository 495; (b) if the given object/node is the receiver node, but the reach factor is not reached, then the message 500/505 is archived (stored) as an insight 685 in the insights repository 495 and the message 500/505 is forwarded in the network 240; and (c) if the given object/node is a pass-through node, then the message 500/505 is forwarded in the network 240 and no insights are saved to the insights repository 495. In one or more embodiments, the message 500/505 is forwarded to the immediate surrounding directly connected nodes as determined from the relationship network 240. In an aspect, and according to the input configuration, the message(s) 500/505 are not forwarded to a node that forms a loop. That is, in an embodiment a message 500/505 whose trace or pathway forms a loop where it is propagated or forwarded to the same node more than once is deemed invalid and is not undertaken or performed by the message dispatcher module 480 (or system 200). In a different aspect, and according to the input configuration, the messages 500/505 are permitted to form a loop. To save insights 685 to the insights repository 495, in one or more embodiments, the message dispatcher 480 invokes the insights module 484 to save the message 500/505 to the insights repository 495. In one or more embodiments the insights 685 can be saved on a node basis. FIG. 7 illustrates a block diagram of the insights 785 from a node 345 being saved to the insights repository 495. The reach factor, also referred to as the relationship degree, is the number of receiver nodes in the pathway or trace to connect back to the initiator or seed node. The reach factor or relationship degree in one or more embodiments is programmable and variable, and can be input by a user when setting the input configuration 260 for the system 200, or more particularly the second part 250 of the system 200.

The message dispatcher module 480 fetches the first initial message or seed message 505 from the message repository 490 and based upon the information in the initial message 505 saves the initial or seed message 505 to the insights repository 495 as described above; terminates the initial message 505 based upon the reach factor; and/or forwards the seed message 505 in the relationship network as a propagated message 500 based upon the reach factor and/or whether the receiver node is a pass through node as defined in the system. For any seed or initial message 505 that is to be forwarded as a propagated message 500, all the nodes directly connected to the receiver node of the seed message 505 are identified in the relationship network 240 and the seed message 505 is forwarded to those directly connected nodes as a propagated message 500. For each propagated message 500, if the directly connected node is (a) within the reach factor, the propagated message 500 is saved and is propagated in the relationship network 240; (b) at the reach factor, the propagated message 500 is saved as an insight and is not forwarded in the relationship network 240 (i.e., the propagated message is terminated); and (c) a pass-through node, the propagated message 500 is forwarded in the network 240. This process of determining the directly connected nodes and forwarding the propagated message 500 in the relationship network 240 is continued until the propagated message 500 is fully propagated and forwarded and has no more valid, directly connected nodes (e.g. propagated message 500 is beyond the reach factor, or in one of more embodiments the pathway or trace of the propagated message 500 forms a loop). As the seed messages 505 and propagated messages 500 are propagated through the relationship network 240, the information contained in the messages 500/505 in or more aspects changes and is updated.

The message dispatcher 480 propagates the messages 500/505 through the network 240 until each message 500/505 is fully propagated, e.g., is beyond the reach factor determined by the input configuration 260. The message dispatcher 480 propagates each message 500/505 through the network 240 until no more messages are left in the system, i.e., the message repository 490. When all the messages are processed and propagated through the network 240, control from the message dispatcher 475 goes back to the message orchestrator 475. The message orchestrator 475 can invoke the insights module 484 to collect insights 685, e.g., the messages 500/505, saved to the insight repository 495. In one or more embodiments, the insights module 484 looks at all the archived messages saved to each node in the insights repository 495 and generates insights for each node. In an aspect, if the aggregate function is selected, the messages saved to the insight repository 495 are aggregated by the condition (e.g., one degree of relationship difference, or two degree of relationship difference), and scores are accumulated, for example, on a node-by-node basis. FIG. 8 is an example of the insights, e.g., archived messages, aggregated on a node-by-node basis. In one or more embodiments, the message orchestrator 475 receives the insights, e.g., the saved messages, from the insights module 484 and adds the insights or portions thereof to the network or graph 240. The insights and the manner of saving the insights can vary with the system and the pattern that is desired to be detected. The input configuration 240 in one or more aspects permits the input criteria, the insights to be collected, and how such insights will be presented and/or transmitted to the end user, to be varied.

Figure 9:
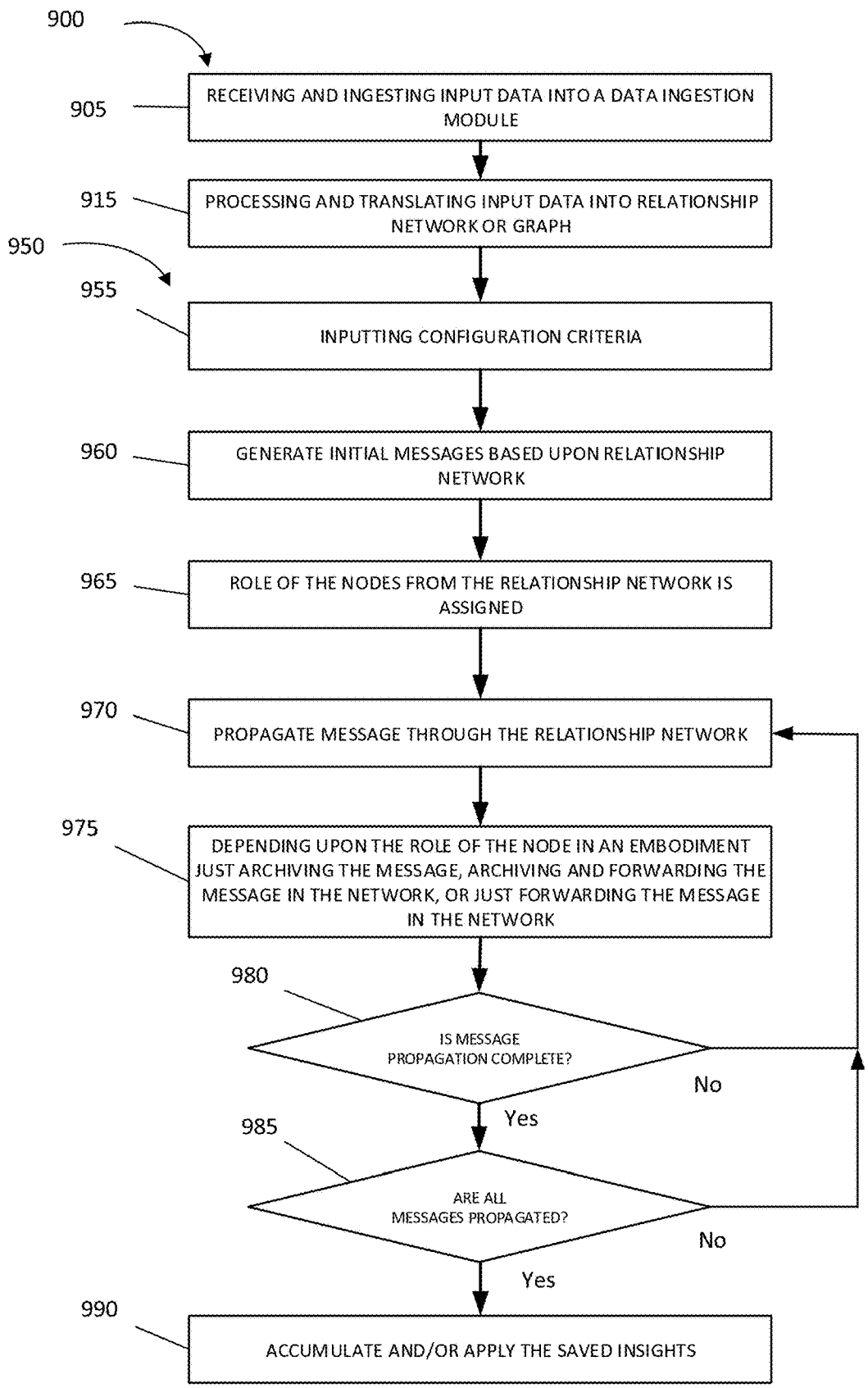
FIG. 9 illustrates an exemplary flowchart illustrating and describing a method of generating and processing messages in a relationship network and saving insights to an insights module.

FIG. 9 is an exemplary flowchart in accordance with one embodiment illustrating and describing a method of detecting data patterns in a relationship network or graph, including in an embodiment, processing and propagating messages generated by a system through the relationship network, detecting data patterns in and saving insights based upon the relationship network. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

In one or more aspects, the method 900 includes at 905 receiving input data and ingesting the input data in one or more embodiments through an ingestion module, and at 915 processing and translating the input data into and/or generating a relationship network or graph. The input data in one or more embodiments includes financial transactional information and can include for example, parties to financial transactions, account numbers involved in the transactions, amounts and times of the transactions, and customers of the transactions. The input data can include other transactional information, such as for example insurance transactional information.

The method 900, and/or sub-method 950 of detecting data patterns in the relationship network or graph includes in one or more aspects a user providing the input configuration to the system at 955. The input configuration informs the system what data patterns to detect in the relationship network and in one or more embodiments what criteria, filters, and/or rules to use when detecting data patterns in the relationship network. At 960, the method generates initial messages, in an aspect through a seed module. The initial messages in one or more aspects are generated based upon the input configuration selected and input by the user and based upon the relationship network. At 965, based on the input configuration that a user inputs into the system, generating the seed messages includes assigning the role of the nodes or objects in the relationship network, and in an aspect the role of initiator or seed node, pass-through node, receiver node and/or target (receiver) node is assigned based upon the input configuration set by a user and/or the relationship network.

In an embodiment, at 970 the message(s), e.g., the first initial message, are propagated through the relationship network in an aspect by a pattern detection module. Propagating the message through the network includes in one or more embodiment reading the messages and looking at the relationship network and based upon the input criteria determining the action to be taken by the system. Propagating the messages includes at 975, based upon the role of the node, performing or taking one of the following actions: (a) archiving the message as an insight; (b) archiving the message as an insight and forwarding the message in the relationship network, or (c) just forwarding the message in the network. In one or more embodiments, propagation of the message is determined by the reach factor or degree of relationship between the seed or initiator node and the receiver node. In an embodiment, the message is not propagated or forwarded in the relationship network after the reach factor is reached. That is, in one or more embodiments, the message is terminated when the reach factor is reached. A user can assign the reach factor and other criteria for the system during step 955. In an embodiment forwarding the message in the network includes forwarding the message to the next immediate, directly connected node and determining the action to be taken. In an embodiment, a message is not forwarded and is terminated, e.g., deemed invalid, where a node in a pathway or trace of the message repeats such that a loop is formed. Archiving the messages includes, in an aspect, saving the message as an insight to an insights repository preferably managed by an insights module.

The message is propagated in the network until it is complete. At 980 the system determines if the message propagation is complete. If the message propagation is not complete (980: No), then the method 900/950 continues at step 970 and propagates the message further in the network, and in one or more embodiments applies the criteria of step 975 to the message. If the message propagation is complete (980: Yes), i.e., the message has been fully propagated through the network, then the method 900/950 continues to step 985 and determines whether or not all the messages have been propagated through the system. If all the messages have not been propagated through the system (985: No), then the system, including in an aspect the message dispatcher module, continues to step 970 and propagates the next seed message that has not been propagated through the system, including in an embodiment applying the actions of step 975. If all the messages have been propagated through the system (985: Yes), then method 900/950 continues to 890.

At 990, insights are accumulated and in an aspect applied in the system, e.g., to the relationship network or graph. In an embodiment, an insights module determines and collects, for each node in the relationship network, all archived messages, and aggregates and collects archived messages for each node. The archived messages are referred to as insights. The insights in one or more embodiments are integrated with, applied to, and/or added to the relationship network or graph. In one or more embodiments the insights comprise a trace, which in an aspect is the pathway taken by the message as it propagates through the relationship network, and impacts nodes of the network. Based upon the insights generated and collected, it can be determined whether or not further investigation is necessary.

Risk by Association Example:

To facilitate explanation of the method and system of detecting suspicious activity, particularly in anti-money laundering (AML) scenarios and financial fraud detection, an example will be used to explain the process, techniques, and operation of the system. The example is merely exemplary and it will be appreciated that any of its details and particular application should not be limiting. In the example, the system receives data 230 and through data ingestion module 220 has generated a relationship or transactional network 240, also referred to as a graph 240 as shown in FIG. 3. It will be appreciated that FIG. 3 only shows a small portion of a typical relationship network 240, and that relationship network 240 is typically, but not necessarily, much larger.

The system can be used to detect data patterns that are indicative of suspicious activity or behavior that may need to be further investigated or reported. In an aspect, the system can be used to detect data patterns indicative of risk by association, money laundering schemes, mule detection, circular money flow, etc. The system receives input configuration from a user, including the type of data pattern, e.g., activity, the system should detect. In one or more embodiments the input configuration sets a number of criteria and filters. The input criteria and input configuration set by user is shown for example in FIG. 10. FIG. 10 shows a number of input criteria to detect a pattern that assigns risk to a receiver node based upon risk by association. In risk by association, among other input criteria, the "seed nodes" are set as a party associated with or that has been identified as having a suspicious activity report (SAR), a politically exposed person (PEP), or a party that has received sanctions; and "receivers" are set as a party; and pass-through nodes are set as accounts. The reach factor is set, and the criteria to terminate the message propagation are set where in the example the reach factor is set as 2 and the message propagation will terminate upon reaching the reach factor. The input criteria includes for one or more embodiments setting node and edge filters, trace (or pathway), cycles allowed, the path, and how insights are aggregated. FIG. 6 is illustrative of the network 240 in FIG. 3 annotated to identify the seed or initiator nodes 641, and the receiver or insight nodes 643. The account nodes 344 are pass-through nodes 644 in the example of risk by association in FIG. 6.

FIG. 10 also shows the input configuration that is set as part of the input configuration 260 for detecting data patterns that are indicative of activity that shows circular money flow, referred to as temporal cycle, where the seed node is defined as an account linked to parties that have a SAR, are a PEP, or have received sanctions; and the receivers and pass-through nodes are defined as accounts. As shown in FIG. 10, for temporal (money flow) cycle, termination is set where the receiver and original sender are the same. As shown by FIG. 10, the input configuration includes identifying or setting one or more of the following: the seed nodes; pass-through nodes; node and edge filters; receiver nodes; trace; reach factor; cycles allowed; path; termination criteria; and aggregation.

After the input configuration is input into the system, the message orchestrator then controls the operation of the seed module which receives input from the input configuration module setting forth the type of activity or pattern the system will search for and detect, and the criteria that the system will use in searching the relationship network to determine if certain patterns of activity are present. The system calls the seed module and passes the input configuration onto the seed module. The seed module initiates the seed messages, e.g., creates or generates the initial messages. For the initial messages, the seed module defines the initiator or seed nodes, and the receiver node(s) based upon the input configuration and the relationship network. An example of the data contained in a message is shown in FIG. 5. For the risk by association pattern with the input configuration as shown in FIG. 11, and the relationship network as shown in FIGS. 3 & 6, there would be two (2) initial messages. The initial messages are determined by finding the seed node P1 and determining what nodes are directly connected to the given node of interest (which for the initial or seed messages are the nodes directly connected to the seed node (P1) 641). The nodes directly connected to seed node P1 is receiver node P2 (643), and account node A1. The first seed message would have original sender as P1, the sender as P1, the receiver as P2, the target receiver as a party (type of object as per criteria defined by the input configurations), and the trace, or pathway, as P1 since the message starts at P1 (the seed node). The last visited object/node as the message is propagated through the nodes in the relationship network is typically added to the list in the trace. The score will be the existing score relationship weight between P1 and P2. The second seed message would have the original sender as P1, the sender as P1, the receiver as A1, the target receiver as a party (type of object as per the criteria defined by the input configuration), the trace is P1, and the score will be the existing score weight relationship between P1 and A1. The two seed messages would be pushed to the message repository for later processing by the message dispatcher module and the seed module provides control back to the message orchestrator.

The message orchestrator then involves the message dispatcher module to read the initial messages and propagate the messages in the network according to the criteria set by the input configuration. The message dispatcher reads the initial messages and processes and propagates the messages according to the criteria set in the input module and based upon the relationship network. When processing the messages, the message will be saved, forwarded, or terminated in the relationship network depending upon the criteria set. In one example, the message is saved in the insights repository if the object or node is the receiver and if the reach factor is not reached, and is also forwarded in the network; the message is just saved in the insights repository (and not forwarded, e.g., the message is terminated) if the object or node is the receiver and if the reach factor is reached; or the message is just forwarded in the system (and not saved in the insights repository) if the object or node is a pass-through node.

An example of the message propagation is shown in FIG. 11 for the risk by association example input configuration shown in FIG. 10. FIG. 8 shows the aggregated insights for the example risk by association having the input configuration shown in FIG. 10 and the message propagation shown in FIG. 11. The initiator or seed node is shown in FIG. 11 as 1105, and 1107 designates the first and second seed messages which are in the message depository. In FIGS. 8 and 11, a single asterisk * designates a message with a first degree relationship or reach factor of 1 between the original sender and the receiver, while two asterisks ** designates a two degree relationship or reach factor of 2 between the original sender and the receiver. Messages with a reach factor of 1 or a reach factor of 2 are saved in the example message propagation as per the input configuration for risk by association shown in FIG. 10. So the message repository has two seed messages, one message in the inbox of P2 as the receiver and one message in the inbox of A1 as the receiver. The message dispatcher is triggered to propagate the seed messages that are in the message repository. The message dispatcher obtains and reads from the message repository the first seed message targeting the P2 node. Since the P2 node is within one degree of the seed node P1, the message is within the reach factor (the reach factor of two is not reached), so the message with trace P1:P2 (sender P1, original sender P1, receiver P2) is saved to the insights repository, and forwarded in the system. That is, the first initial seed message is pushed to the insights module which saves the message in the insights repository. As shown in FIGS. 8 and 11, the first initial message with trace P1:P2 has a degree or reach factor of 1. The system, e.g., the message dispatcher 480, forwards the message and when forwarding the message with trace P1:P2 looks at the network 240 and determines the next immediately directly connected nodes to the receiver node P2, which are P1 and P3. Propagating the first seed message back to P1, e.g., trace P1:P2:P1, forms a loop and is invalid (node P1 repeats in the trace of the message). The message would have a "sender" P2, an original sender P1, and receiver A1, where the target receiver is a party as defined by the input configuration. Forwarding the first seed message to P3, from P2, is valid and has a reach factor of 2 as shown by the first entry designated 1110 in FIG. 11. Since the propagated message with trace P1:P2:P3 has a reach factor of two the message is saved to the insights repository 495 as shown in FIG. 8. The message has sender P2, original sender P1, and receiver P3, where the target receiver is a party as defined by the input configuration. The message is also terminated and no longer propagated in the network since the reach factor of 2 is attained.

The system also reads the second seed message with a trace of P1:A1 targeting the A1 node. Since the A1 node is a pass-through node, the second seed message having trace P1:A1 is not saved in the insights module and the second seed message is forwarded in the network. Since the second seed message with trace P1:A1 is to be forwarded in the network, the system then looks at the network to determine the nodes directly connected to the initial target node A1, which are nodes P1, P3 and A2. For a message propagating through or traversing the network from node P1 to node P1, through node A1, the message would have a trace or pathway of P1:A1:P1 which would be circular and would not be saved and would be invalid as a loop. For a message traversing through the network from node P1 to node P3, through node A1, the message would have a trace or pathway of P1:A1:P3 as shown by the second entry designated 1110 in FIG. 11. The message having such a trace or pathway of P1:A1: P3 has a reach or degree of 1 and the message is saved in the insights repository 495 and is forwarded in the system. A message traversing the network from node P1 to node A2, through node A1, would have a trace or pathway of P1:A1:A2 as shown by the third entry designated 1110 in FIG. 11, and would be forwarded in the network since node A2 is a pass-through node.

The message propagation in the network continues because the messages have not been terminated. Considering the message with trace P1:A1:P3, the system looks at the network 240 of FIG. 3 and the nodes directly connected to node P3 are nodes P2, A1 and A2. A message traversing through the network from node P1 to node P2, through nodes Aland P3, would have a trace or pathway of P1:A1: P3:P2 as shown by the first entry designated 1115 in FIG. 11. The message having such a trace or pathway of P1:A1:P3:P2 has a reach or degree of 2 and the message is saved in the insights module, but is not forwarded in the system. The message with trace P1:A1:P3:P2 is terminated. A message traversing the network from node P1 to node A2, through nodes A1 and P3, would have a trace or pathway of P1:A1:P3:A2 as shown by the second entry designated 1115 in FIG. 11, would be forwarded in the network since node A2 is a pass-through node, and no insights would be saved. A message traversing through the network from node P1 to node A1, through node P3 would have a trace of P1:A1:P3: A1 which would form a loop and be invalid.

Continuing with the example of message propagation based upon the input configuration of FIG. 10 and the network of FIGS. 3 & 6, and considering the message with trace P1:A1:A2 that is to be forwarded in the network 240, the system looks at node A2 and determines the nodes directly connected to node A2 are nodes A1, P3, P4, and A3. A message traversing through the network from node P1 to node A1, through nodes A1 and A2, would have a trace or pathway of P1:A1:A2:A1 and would be invalid as a loop. A message would also be propagated and traverse the network from node P1 to node P3, through nodes A1 and A2, and the message would have a trace or pathway of P1:A1:A2:P3 as shown by the third entry designated 1115 in FIG. 11. The message having such a trace or pathway of P1:A1:A2:P3 has a reach or degree of 1, the message is saved in the insights repository 495 by the insights module 490, and is forwarded in the network. A message would be propagated through and traverse the network from node P1 to node P4, through nodes A1 and A2, and the message would have a trace or pathway of P1:A1:A2:P4 as shown by the fourth entry designated 1115 in FIG. 11. The message having such a trace or pathway of P1:A1:A2:P4 has a reach or degree of 1, is saved in the insights repository, and is forwarded in the network. A message would be propagated and traverse the network from node P1 to node A3, through nodes A1 and A2, and the message would have a trace or pathway of P1:A1:A2:A3 as shown by the fifth entry designated 1115 in FIG. 11. The message having such a trace or pathway as P1:A1:A2:A3 would be forwarded in the network since node A3 is a pass-through node, and no insights would be saved.

The message propagation example based upon the input configuration of FIG. 11 and the network of FIG. 3, continues where the message having a trace P1:A1:P3:A2 is propagated in the network 240. The network 240 would be considered and nodes directly connected to node A2 would be determined, which are nodes A1, P3, P4, and A3. Messages with traces of P1:A1:P3:A2: A1 and P1:A1:P3:A2:P3 form a loop and would be invalid. A message with trace P1:A1:P3:A2:P4 would have a reach factor or two, would be saved in the insights module, and would be terminated. A message with trace P1:A1:P3:A2:A3 would be forwarded in the network as node A3 is a pass-through node.

The message propagation example based upon the input configuration of FIG. 10 and the network of FIG. 3, continues where the message having a trace of P1:A1:A2:P3 is forwarded. The network 240 is reviewed to determine the nodes directly connected to P3, which are nodes P2, A1, and A2. The messages having a trace of P1:A1:A2:P3:A1 and P1:A1:A2:P3:A2 are invalid as loops. The message having a trace of P1:A1:A2:P3:P2 has a reach factor of 2, as shown in FIG. 11, is saved to the insight repository as shown in FIG. 8, and is terminated. The message propagation example based upon the input configuration of FIG. 10 and the network of FIG. 3, continues where the message having a trace of P1:A1:A2:P4 is propagated and forwarded in the network 240. The network 240 is reviewed and the only node directly connected to node P4 is node A2, but the message with a trace of P1:A1:A2:P4:A2 is invalid because it forms a loop. The message propagation example based upon the input configuration of FIG. 10 and the network of FIG. 3, continues where the message having a trace of P1:A1:A2:A3 is forwarded. The network 240 is reviewed to determine the nodes directly connected to A3, which are nodes A2 and P5. The message having a trace of P1:A1:A2:A3:P5 has a reach factor of 1 as shown in FIG. 11, is saved to the insight repository as shown in FIG. 8, and is forwarded in the network. The message having a trace of P1:A1:A2:A3:A2 forms a loop and is invalid.

The message propagation example based upon the input configuration of FIG. 10 and the network of FIG. 3, continues where the message having a trace of P1:A1:P3:A2:A3 is forwarded in the network 240. The network 240 is reviewed to determine the nodes directly connected to A3, which are nodes A2 and P5. The message having a trace of P1:A1:P3:A2:A3:P5 has a reach factor of 2 as shown in FIG. 11, is saved to the insight repository as shown in FIG. 8, and is terminated. The message having a trace of P1:A1:A2:A3:A2 forms a loop and is invalid. The message propagation example based upon the input configuration of FIG. 10 and the network of FIG. 3, continues where the message having a trace of P1:A1:A2:A3:P5 is forwarded in the network 240. The network 240 is reviewed to determine the nodes directly connected to node P5, which is node A3. The message having a trace of P1:A1:A2:A3:P5:A3 forms a loop and is invalid.

During message propagation certain messages are saved as insights in the insights repository. When all the seed messages for all the seed nodes have been processed and propagated through the relationship network, which can be a large relationship network or graph based upon a large amount of input data, the message orchestrator calls for insights. In one or more embodiments the message orchestrator calls the insights module which aggregates the data on the target node and prepares the insights. The network 240 shown in FIG. 3 having an input configuration as shown in FIG. 10 and the message propagation as shown in FIG. 11 has an annotated network as shown in FIG. 6 and saved insights as shown in FIG. 8 where a single asterisk * indicates that the message had a first degree relationship with the seed node P1, and two asterisks  indicates that the message had a second degree relationship with the seed node P1. It should be noted that a reach of 1 or a first degree relationship is also referred to as a 1 hop, whereas a reach of 2 or a second degree relationship is referred to as 2 hop. The insights as aggregated are shown in FIG. 8 for the example risk by association input shown in FIG. 10 where the insights are collected and aggregated for each receiver node P2-P5. FIG. 8** for example, shows that node P2 in the example has three saved messages or insights, node P3 has three saved insights, node P4 has two saved insights, and node P5 has two saved insights. In one or more embodiments the insights are saved back to and/or applied to the relationship or data network, or graph.

It is contemplated that the system will be updated with additional input data over time. For example, after a first run of the system and method, a bank, financial institution, insurance organization, etc., could periodically, for example daily, monthly, bi-yearly, etc., update the system with additional data. In one or more embodiments the system detects updates to the network 240 as a new object/node added, a new relationship added, an update to an existing relationship, delete an object/node, or delete a relationship. The system in one or more embodiments will review the traces and determine which paths need to be redone, e.g., re-propagated, or where there are new paths to be traversed. The system and method in one or more embodiments can be updated, and in an embodiment, a trace is used to determine one or more paths needed to recreate the message propagation in the relationship or data network to obtain updated insights based upon new updated data or to determine any new path that needs to be traversed because of the new data. The system when performing the update will initiate the propagation, add updates to the archives, and re-run the insights module on the impacted nodes where updates are added to the insights repository and insights are regenerated.

Figure 12:
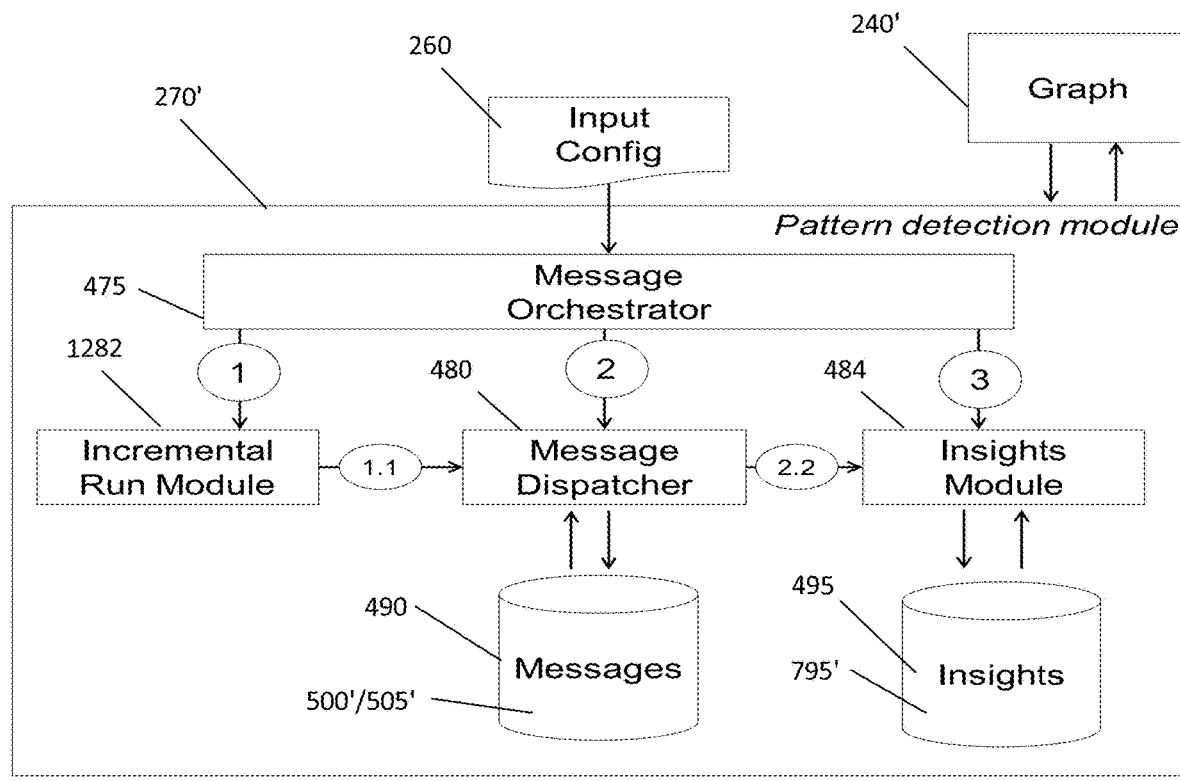
FIG. 12 illustrates an example block diagram of a system for updating a system with additional data and method for detecting data patterns and creating insights based upon processing of messages in a relationship network.

FIG. 12 shows an embodiment of a system and method of running an incremental run with updated data. The system for running the incremental run includes the pattern detection module 270' having message orchestrator 475, message dispatcher 480, incremental run module 1282, insights module 484, message repository 490, and insights repository 495. The pattern detection module 270' receives input configuration 260 and interfaces and reads data from relationship network/graph 240. The message orchestrator 475, message dispatcher 480, message repository 490, insights module 484, and insight repository 495 in pattern detection module 270' is substantially the same or substantially the same as in pattern detection module 270. In an embodiment, the incremental run module 1282 filters messages due to updates to the network 240', so that the filtered messages can be propagated through the network, and/or in an aspect identifies more seed messages to be created for new records (new initiator nodes, pass-through nodes, and/or receiver nodes). Messages from the updates to the receiver nodes/objects in the network, and/or seed messages for new records, are sent via the message dispatcher 480 to the message repository 490. The rest of the process remains the same for the incremental runs as for the original pattern detection operations. The message dispatcher propagates the new and/or updated messages and new/updated insights will be generated and saved. The new insights can be aggregated and collected the same as, or similar to, the previous process of aggregating and collecting insights for the original, initial data run. The sub-module filters messages for a re-run due to updates, and identifies more seed messages for new records, and propagates the updated and new messages and then calls the insights module to aggregate the results.

Figure 13:
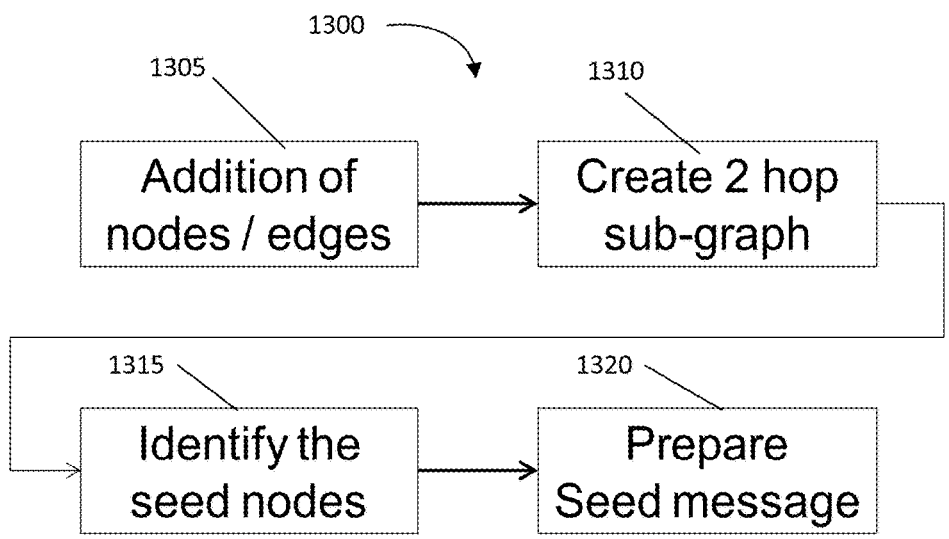
FIG. 13 illustrates an example block diagram of a method for updating a system and detecting data patterns and creating insights based upon processing and propagating messages in a network system.

FIG. 13 shows an embodiment of a system and method 1300 of running an incremental run with updated data. The system or technique includes at 1305 adding additional nodes to the relationship network. Create at 1310 a 2 hop sub-graph (e.g., network) for each object or node that was added, and from the sub-graph identify at 1315 all nodes that match the seed node criteria, and at 1320 recreate the seed messages, and re-run the process. After recreating the seed messages the message dispatcher module will then feed the new messages to the system, and the system will process and propagate the messages through the network until all the recreated seed messages are run. The insights module is retriggered to create new/updated insights.

Figures 14, 15:
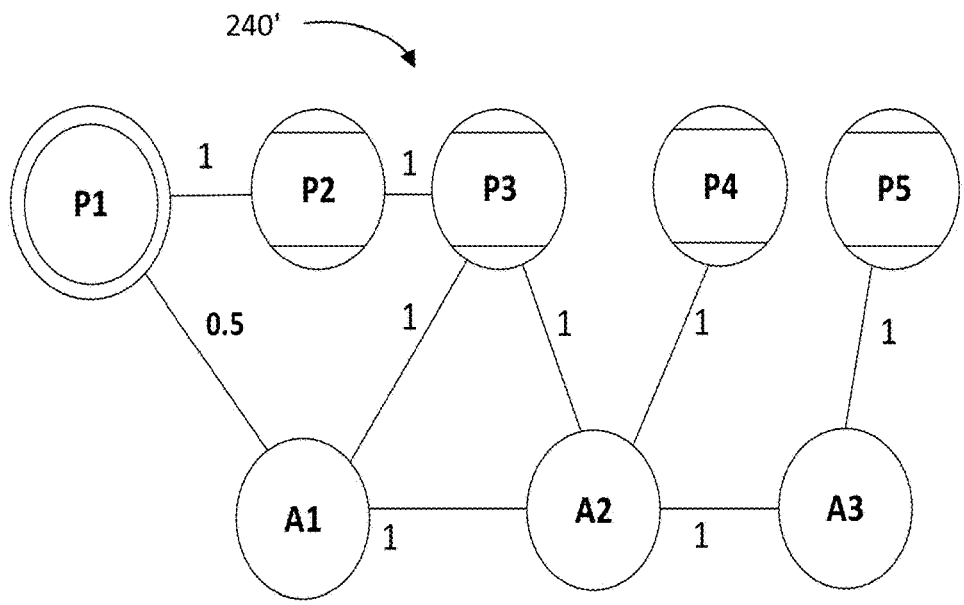
FIG. 14 illustrates an example embodiment of a relationship network updated with additional data.
FIG. 15 illustrates an example of impacted paths as a result of updating a system for detecting patterns because of an updated relationship network.

FIG. 14 provides an example of an updated relationship network 240' where the weight of the relationship between P1 and A1 has been updated (changed weight from 1.0 to 0.5) since the weight of the relationship between P1 and A1 has been effected. The system looks at insights which have P1: A1 in the trace and identifies P2, P3, P4, and P5 as being impacted by the change/update to the relationship network 240'. All the insights, e.g., saved messages, using the affected trace P1:A1, are replayed and re-propagated to get the updated insights 795'. From FIG. 11, all messages which had as part of their trace P1:A1 are redone, and the updated message propagation is shown in FIG. 15. The updated insights module is called to aggregate and collect the updated insights as shown in FIG. 16.

In one or more embodiments a computing system is disclosed that in one or more aspects includes an input configuration module configured to receive configuration criteria for the system to define data patterns to be detected; and a pattern detection module configured to detect data patterns as defined by the configuration criteria received from the input configuration module. The pattern detection module in an embodiment includes a message orchestrator configured to control the pattern detection module; a seed module configured to generate one or more seed messages based upon information received from the message orchestrator; a message dispatcher module configured to propagate the one or more seed messages through the relationship network as propagated messages; and an insights module configured to save insights in an insights repository. In one or more embodiments the system further includes computer readable storage medium comprising program instructions that when executed by the pattern detection module cause the pattern detection module to: receive information on the relationship network; receive the configuration criteria from the configuration module; determine whether the seed messages, the propagated messages, and combinations of the seed messages and the propagated messages meet insight criteria based upon the information the pattern detection module receives on the relationship network and the configuration criteria the pattern detection module receives from the input configuration module; and save the seed messages, the propagated messages, or combinations of the seed messages and the propagated messages that meet insight criteria.

The system in an aspect further includes computer readable storage medium having program instructions that when executed cause the system to: generate one or more messages based upon the relationship network and the configuration criteria; and propagate the one or more messages within the relationship network based on: forwarding the message in the relationship network if a receiver of the message is a pass-through node or is within the reach factor of an original sender, or terminating the message if the receiver of the message is outside the reach factor of the original sender, where the reach factor is the relationship of the original sender to the receiver as set by the input configuration criteria. The system in an aspect further includes programming instructions that when executed cause the pattern detection module to archive the one or more messages if the receiver of the message is within the reach factor set by the input configuration criteria. In an embodiment, the system further has computer readable storage medium having program instructions that when executed cause the system to read the generated messages, and based upon the relationship network forward the generated messages in the relationship network. The system further includes in an embodiment program instructions that when executed cause the system to determine the one or more nodes directly connected to the receiver of the message based upon the relationship network, and forward the message to the directly connected nodes.

The system in an aspect further has program instructions that when executed cause the system to not forward the message in the relationship network if a pathway the message traverses in the relationship network from the original sender to the receiver forms a loop. The computer readable storage medium in an embodiment further has program instructions that when executed cause the insights module to archive the messages in an insights repository, and in an embodiment collect and aggregate the archived messages for each node as insights. The system further includes in an embodiment program instructions that when executed cause the system to use a trace to update the message propagation to identify new nodes and any new insights as a result of updating the relationship network with additional input data.

The system in one or more embodiments further has computer readable storage medium having program instructions that when executed cause the system to: to generate the one or more seed messages based upon the relationship network and the information received from the message orchestrator, and assign a role of the nodes in the relationship network as one of either an original sender node, pass-through node, or receiver node based upon the relationship network and information received from the message orchestrator. In an aspect, the system also has program instructions that when executed cause the system to: read the one or more seed messages; propagate the one or more seed messages based upon on: forwarding each seed message as a propagated message if the receiver node of the seed message is a pass-through node or is within the reach factor of the original sender node, forwarding each propagated message if the receiver node of the propagated message is a pass-through node or is within the reach factor of the original sender node, or terminating the seed message or propagated message if the receiver node is outside the reach factor of the original sender node or if a pathway the seed message or propagated message traverses in the relationship network from the original sender node to the receiver node forms a loop; and determining from the relationship network the one or more nodes directly connected to the receiver node of the seed message or the propagated message and forwarding the seed message or propagated message to the one or more directly connected nodes as the new receiver node. In an aspect, the program instructions when executed by the pattern detection module cause the system to collect and aggregate insights on a per node basis, and apply the insights to the relationship network.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. What is meant is by executable by the processor is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of detecting data patterns in a relationship network that are indicative of suspicious activity, comprising:
    inputting configuration criteria into a system to define the data patterns to be detected in the relationship network, including setting a reach factor wherein the reach factor is a relationship of an original sender to a receiver of the message in the relationship network;
    generating one or more messages based upon the relationship network and the configuration criteria;
    propagating the one or more messages within the relationship network based on:
    forwarding the message in the relationship network if the receiver of the message is a pass-through node or is within the reach factor of the original sender, or terminating the message if the receiver of the message is outside the reach factor of the original sender; and
    archiving the one or more messages if the receiver of the message is within the reach factor set by the input configuration criteria, wherein archiving the message indicates that the defined data patterns have been detected.

2. The method of claim 1, wherein generating one or more messages based upon the relationship network and the configuration criteria comprises assigning a role of nodes in the relationship network as one of either initiator node, pass-through node, or receiver node based upon the configuration criteria and the relationship network.

3. The method of claim 1, wherein the one or more messages are generated by a seed module.

4. The method of claim 1, wherein the one or more generated messages are saved to a message repository.

5. The message of claim 4, wherein the one or more messages are generated by the seed module and the generated messages are saved to the message repository by a message dispatcher module.

6. The method of claim 1, further comprising a message dispatcher module propagating the one or more messages within the relationship network.

7. The method of claim 6, further comprising the message dispatcher module fetching the generated messages from a message repository, reading the generated messages, and based upon the relationship network forwarding the generated messages in the relationship network.

8. The method of claim 1, wherein forwarding the generated message comprises determining the one or more nodes directly connected to the receiver of the message based upon the relationship network and forwarding the message to the directly connected nodes.

9. The method of claim 1, wherein the message is not forwarded in the network if a pathway the message traverses in the relationship network from the original sender to the receiver forms a loop.

10. The method of claim 1, further comprising archiving the messages in an insights repository.

11. The method of claim 10, further comprising implementing an insights module to archive the messages in the insights repository.

12. The method of claim 1, further comprising collecting and aggregating the archived messages for each node as insights.

13. The method of claim 12, further comprising implementing an insights module to collect and aggregate the archived messages for each node.

14. The method of claim 1 further comprising updating the relationship network with additional input data, and using a trace to update the message propagation to identify new nodes and any new insights as a result of updating the relationship network with additional input data.

15. The method of claim 1, wherein the relationship network is based upon financial transaction information wherein the relationship network comprises nodes and relationship links between the nodes, wherein the nodes are parties to a financial transaction or accounts.

16. The method of claim 1, further including selecting configuration criteria to detect data patterns indicative of at least one of the group consisting of risk by association, money laundering, and mule detection.

17. A system for detecting patterns in a relationship network, the system comprising:
- a non-transitory memory storage device storing programming instructions; and
- a hardware processor coupled to said non-transitory memory storage device, the hardware processor configured to execute said programming instructions,
- wherein the non-transitory memory storage device comprises:
- an input configuration module having programming executable for inputting configuration criteria into the system to define the data patterns to be detected, the input configuration module configured and adapted to receive input from a user; and
- a pattern detection module having programming executable receive the configuration criteria from the configuration module and to receive relationship network information, the pattern detection module having programming instructions executable to detect data patterns as defined by the configuration criteria input in the input configuration module, wherein the pattern detection module comprises:
- a message orchestrator having programming instructions executable to control the pattern detection module;
- a seed module having programming instructions executable to generate one or more seed messages based upon information received from the message orchestrator;
- a message dispatcher module having programming instructions executable to propagate the one or more seed messages through the relationship network as propagated messages; and
- an insights module having programming instructions executable to save insights in an insights repository, wherein the pattern detection module has programming instructions executable to receive information on the relationship network and the insights module has programming instructions executable to save the seed messages, the propagated messages, and combinations of the seed messages and the propagated messages as insights based upon the information the pattern detection module receives on the relationship network and the configuration criteria received from the input configuration module which are both used to determine whether the seed messages or propagated messages meet insight criteria.

18. The system of claim 17, wherein the seed module has programming instructions executable to generate the one or more seed messages based upon the relationship network and the information received from the message orchestrator, and wherein the seed module has programming instructions executable to assign a role of the nodes in the relationship network as one of either an original sender node, pass-through node, or receiver node based upon the relationship network and information received from the message orchestrator.

19. The system of claim 18, wherein the message dispatcher module has programming instructions executable to read the one or more seed messages and propagate the one or more seed messages based upon on:
- forwarding each seed message as a propagated message if the receiver node of the seed message is a pass-through node or is within the reach factor of the original sender node;
- forwarding each propagated message if the receiver node of the propagated message is a pass-through node or is within the reach factor of the original sender node; or
- terminating the seed message or propagated message if the receiver node is outside the reach factor of the original sender node or if a pathway the seed message or propagated message traverses in the relationship network from the original sender node to the receiver node forms a loop,
- wherein forwarding each seed message or each propagated message includes determining from the relationship network the one or more nodes directly connected to the receiver node of the seed message or the propagated message and forwarding the seed message or propagated message to the one or more directly connected nodes as the new receiver node.

20. The system of claim 17, wherein the insights module further has programming instructions executable to collect and aggregate insights on a per node basis, and the pattern detection module has programming instructions to apply the insights to the relationship network.

* * * * *